United States Patent
Duan et al.

(10) Patent No.: US 8,402,607 B2
(45) Date of Patent: Mar. 26, 2013

(54) HINGE ASSEMBLY FOR FOLDABLE ELECTRONIC DEVICE

(75) Inventors: Chao Duan, Shenzhen (CN); Chia-Hua Chen, Taipei (TW)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 278 days.

(21) Appl. No.: 12/915,037

(22) Filed: Oct. 29, 2010

(65) Prior Publication Data

US 2012/0030904 A1     Feb. 9, 2012

(30) Foreign Application Priority Data

Aug. 6, 2010   (CN) .......................... 2010 1 0247445

(51) Int. Cl.
E05F 1/08 (2006.01)
(52) U.S. Cl. ................. 16/303; 16/330; 29/11
(58) Field of Classification Search .............. 16/330, 16/303, 326, 329, 334; 361/679.08, 679.11, 361/679.02, 679.15, 679.27; 455/90.3, 575.1, 455/575.3, 575.8; 379/433.12, 433.13; 348/373, 348/333.01, 333.06, 794; 29/11
See application file for complete search history.

(56) References Cited

U.S. PATENT DOCUMENTS

| | | | | |
|---|---|---|---|---|
| 6,085,387 A * | 7/2000 | Han | .................... | 16/330 |
| 6,530,121 B2 * | 3/2003 | Hayashi | .................... | 16/330 |
| 6,633,643 B1 * | 10/2003 | Ona | .................... | 379/433.13 |
| 7,150,072 B2 * | 12/2006 | Huang et al. | .................... | 16/312 |
| 7,173,825 B2 * | 2/2007 | Han et al. | .................... | 361/725 |
| 7,383,618 B2 * | 6/2008 | Lu et al. | .................... | 16/330 |
| 2002/0013979 A1 * | 2/2002 | Hayashi | .................... | 16/330 |
| 2004/0137970 A1 * | 7/2004 | Han | .................... | 455/575.3 |

* cited by examiner

Primary Examiner — Chuck Y. Mah
(74) Attorney, Agent, or Firm — Altis Law Group, Inc.

(57) ABSTRACT

An exemplary hinge assembly includes a sleeve, a first member, a second member, and a resilient member. The sleeve includes a sleeve wall and an open end. The first member is received in the sleeve. The second member is located next to the first member. One of the first member and the second member have a cam, the other of the first member and second member have a cam follower interacting with the cam so that the first member rotates about an axis and the second member moves linearly along the axis when the cam follower follows the cam. The resilient member is fitted in the sleeve and provides an elastic force to bias the first member and the second member into contact with each other. At least one tab is formed adjacent to the open end and blocking a minor portion of the open end. The at least one tab retains the first, second, and resilient members in the sleeve for preventing them from escaping the sleeve through the open end.

18 Claims, 7 Drawing Sheets

HINGE ASSEMBLY FOR FOLDABLE ELECTRONIC DEVICE

CROSS-REFERENCE TO RELATED APPLICATION

This application is related to co-pending U.S. patent application Ser. Nos. 12/915,038 and 12/915,039, entitled "HINGE ASSEMBLY FOR FOLDABLE ELECTRONIC DEVICE", by Duan et al., which have the same assignee as the present application. The above-identified applications are incorporated herein by reference.

BACKGROUND

1. Technical Field

The present disclosure relates to hinge assemblies and, particularly, to a hinge assembly for foldable electronic devices such as mobile phones and portable computers.

2. Description of Related Art

One of the most popular types of portable electronic device in the marketplace is the foldable mobile phone, which generally includes a cover section and a body section. The cover section and the body section are rotatably interconnected through a hinge assembly, allowing the telephone to move between an open position and a closed position.

However, traditional hinge assemblies include a large number of mechanical elements. Thus, the assembly process can be relatively complicated.

Therefore, there is room for improvement within the art.

BRIEF DESCRIPTION OF THE DRAWINGS

Many aspects of the present hinge assembly can be better understood with reference to the following drawings. The components in the drawings are not necessarily drawn to scale, the emphasis instead being placed upon clearly illustrating the principles of the present hinge assembly. Moreover, in the drawings, like reference numerals designate corresponding parts throughout the several views.

DETAILED DESCRIPTION

Figure 1:
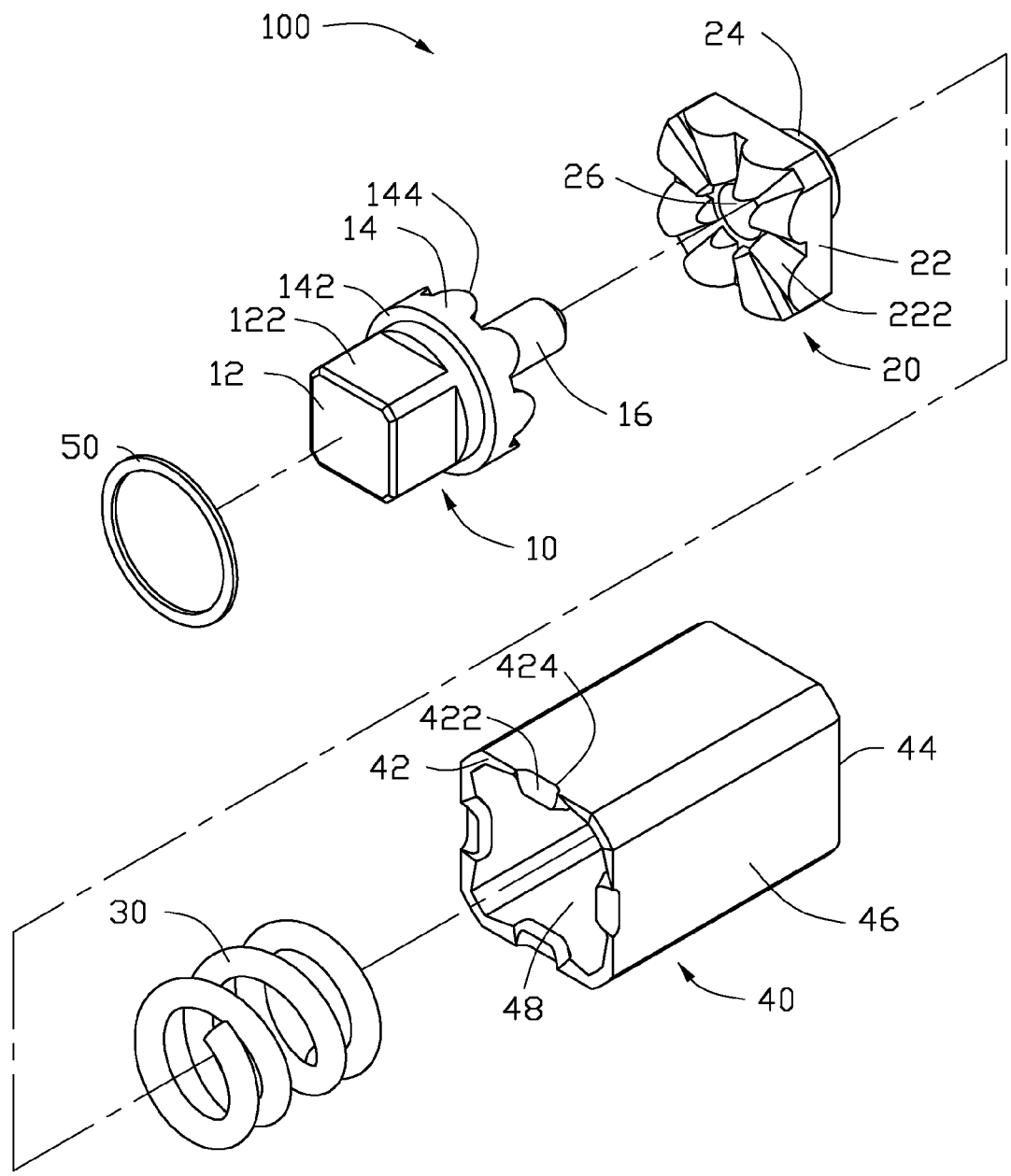
FIG. 1 is an exploded, isometric view of a hinge assembly according to an exemplary embodiment.
Figure 2:
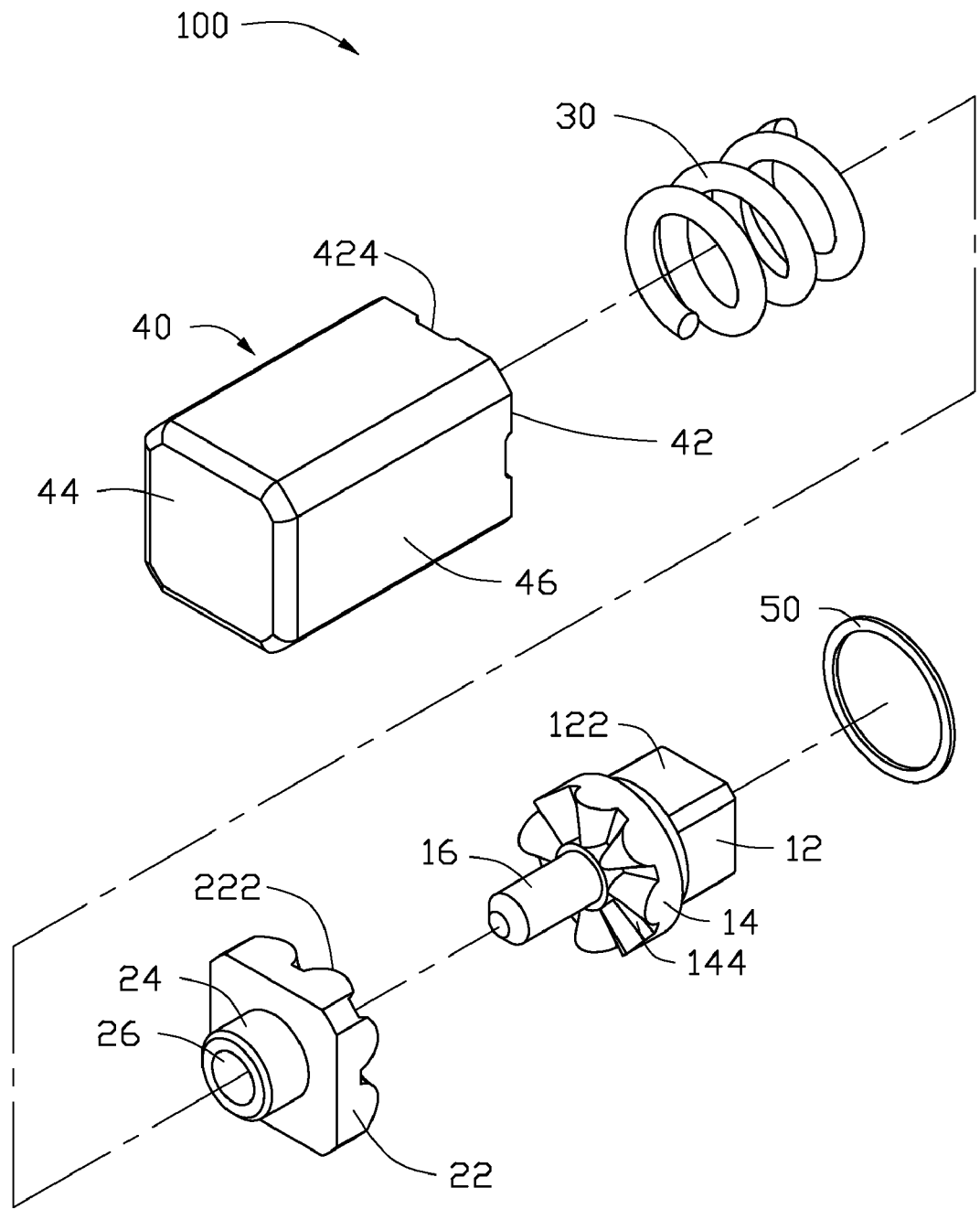
FIG. 2 is similar to FIG. 1, but shown from another aspect.

FIGS. 1 and 2 show a hinge assembly 100 according to an exemplary embodiment of the present hinge system. The hinge assembly 100 includes a first member 10, a second member 20, a resilient member 30, and a loop ring 50, all accommodated in a sleeve 40.

The first member 10 coaxially includes a head portion 12, a cam portion 14, and a shaft portion 16 integrally formed together. The head portion 12 is for engaging with a body section of a foldable electronic device. In an exemplary embodiment, the head portion 12 is substantially cubic, and includes a plurality of planar surfaces 122.

The cam portion 14 is formed at one side of the head portion 12, and has a larger radius than the head portion 12. A stepped surface 142 is formed between the cam portion 14 and the head portion 12. The cam portion 14 includes a cam surface 144. Each cam surface 144 includes a plurality of peaks and valleys. The shaft portion 16 extends from a central area of the cam portion 14 far away from the head portion 12.

The second member 20 includes a latching cam portion 22 and a guiding shaft 24 extending from the latching cam portion 22. The latching cam portion 22 includes a plurality of planar surfaces for slidable and non-rotatable engagement with the sleeve 40. The latching cam portion 22 includes a latching cam surface 222 for engaging with the cam surfaces 144 of the first member 10. The guiding shaft 24 is integrally formed with the latching cam portion 22. A longitudinal passage 26 is defined in the second member 20 for communicating the latching cam portion 22 with the guiding shaft 24.

The resilient member 30 can be spiral-shaped (e.g. a coil spring). The resilient member 30 exerts elastic force on the second member 20 to push the second member 20 toward the first member 10. The resilient member 30 has an inside diameter which is large enough to allow it to be fit over the guiding shaft 24.

The sleeve 40 is substantially a hollow container. In this exemplary embodiment, the sleeve 40 is substantially cubic and is for being non-rotatably connected to a cover section of a foldable electronic device. The sleeve 40 includes a flat open end 42, a closed end 44, and a sleeve wall 46. The open end 42 is opposite to the closed end 44. A receiving hole 48 is defined in the sleeve wall 46. The first member 10, the second member 20, the resilient member 30, and the loop ring 50 can be assembled into the receiving hole 48 directly through the open end 42. At least one tab 422 is formed on the open end 42. In this exemplary embodiment, a plurality of tabs 422 are formed near the open end 42 by punching the sleeve wall 46 at positions adjacent to the open end 42. Each tab 422 radially extends partially into the open end 42 a minor amount, e.g., an amount just large enough to prevent the elements contained in the sleeve 40 from separating from the sleeve 40, by tabs 422 blocking a minor amount (i.e., less than substantially all) of open end 42.

In this exemplary embodiment, a notch 424 is defined in the sleeve wall 46 corresponding to each tab 422. The notches 424 and the tabs 422 can be simultaneously formed by using a punch press process. In punching the sleeve 40, a punch is axially aligned with the sleeve 40, and is opposite to the open end 42. The punch presses the open end 42 from outside to directly form the tabs 422. Alternatively, the punch may be radially aligned with the open end 42 to press the open end to form the tabs 422. Since the tabs 422 are formed after assembling the above elements into sleeve 40 and then only by slightly modifying the shape of opening 42, the assembly process is simple. In addition, the sleeve 40 does not need an extra element to prevent the inner elements in the sleeve 40 from escaping the sleeve 40. Thus, the hinge assembly 100 includes fewer elements, and costs are greatly reduced and manufacturing simplified.

The loop ring 50 can be made of metal, and may be fitted over the head portion 12. The loop ring 50 can abut against the step surface 142 for reducing wear and tear on the head portion 12 cause by the tabs 422.

Figure 3:
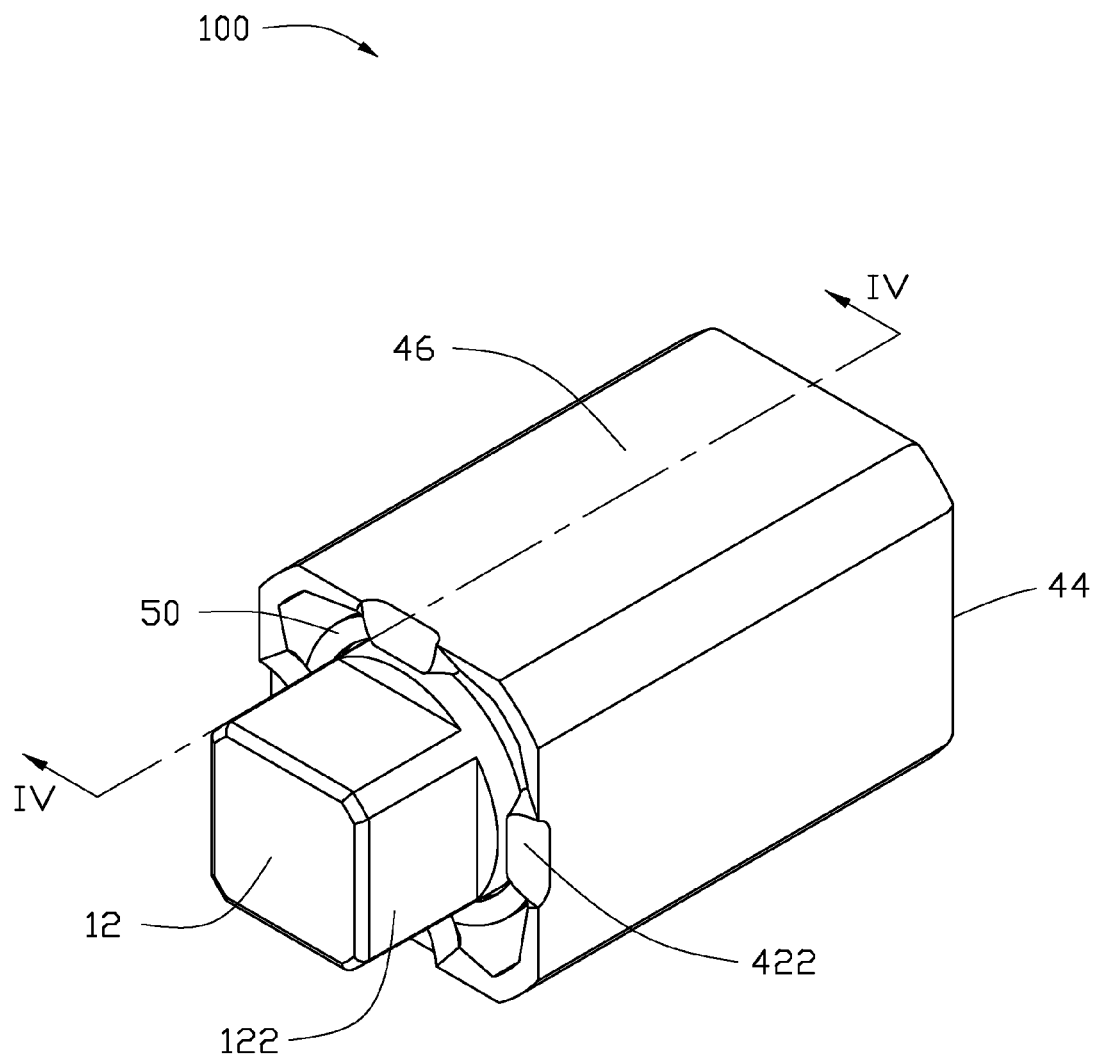
FIG. 3 is an assembled view of the hinge assembly shown in FIG. 1.
Figure 4:
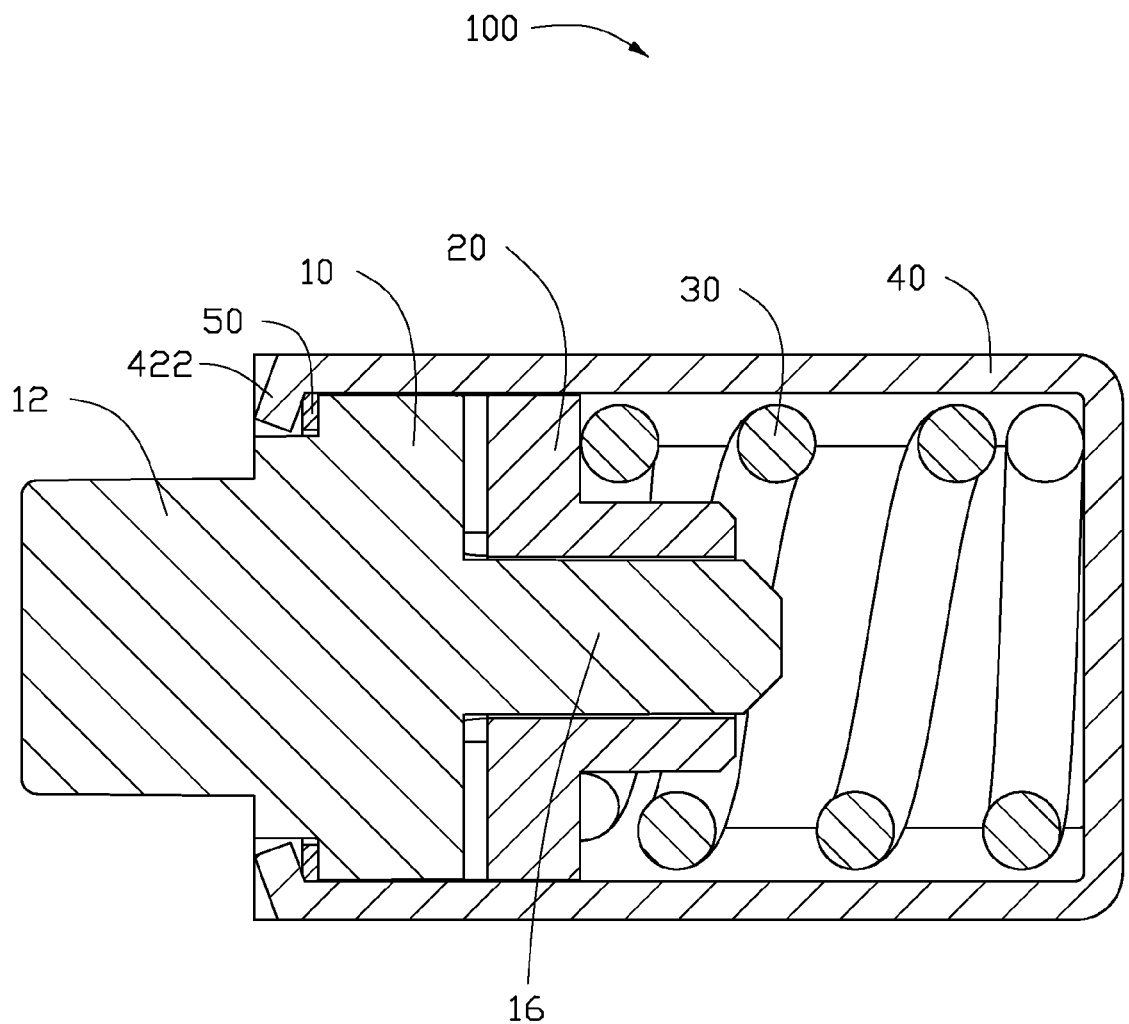
FIG. 4 is a cross sectional view of the sleeve in FIG. 1 taken along line IV-IV.

Referring to FIGS. 3 and 4, the resilient member 30, the second member 20 and the first member 10 are orderly received in the sleeve 40. The latching cam surface 222 of the second member 20 engages with the cam surface 144 of the first member 10. One end of the resilient member 30 abuts against the close end 44, and the opposite end of the resilient member 30 abuts against the second member 20. The head portion 12 is exposed from the sleeve 40. The open end 42 is processed to form the plurality of tabs 422 at the open end 42. The first member 10 is thus rotatably positioned in the sleeve 40, but kept from falling out of the sleeve 40 by the tabs 422. Accordingly, the hinge assembly 100 is integrated into a complete unit.

Figure 5:
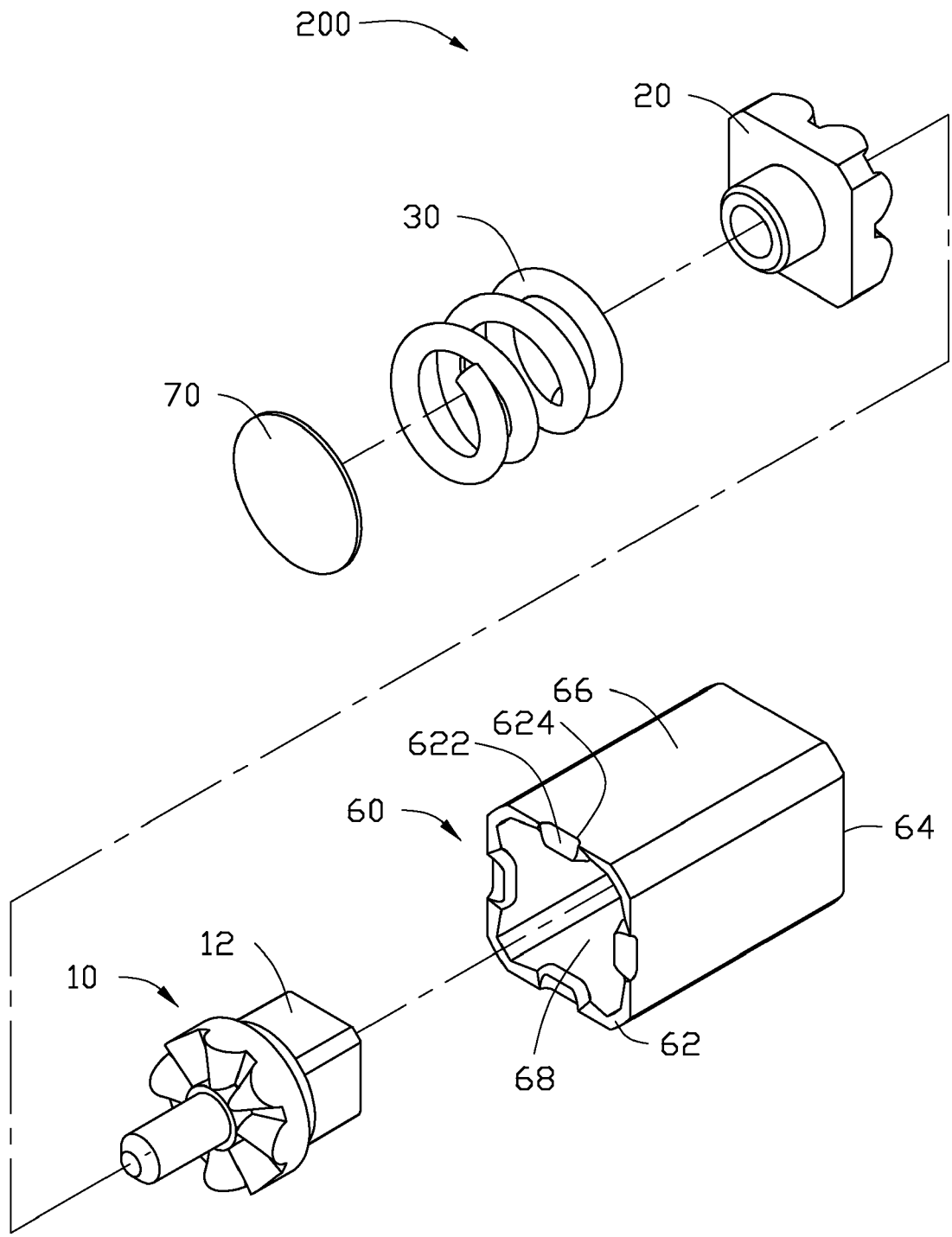
FIG. 5 is an exploded, isometric view of a hinge assembly according to another exemplary embodiment.
Figure 6:
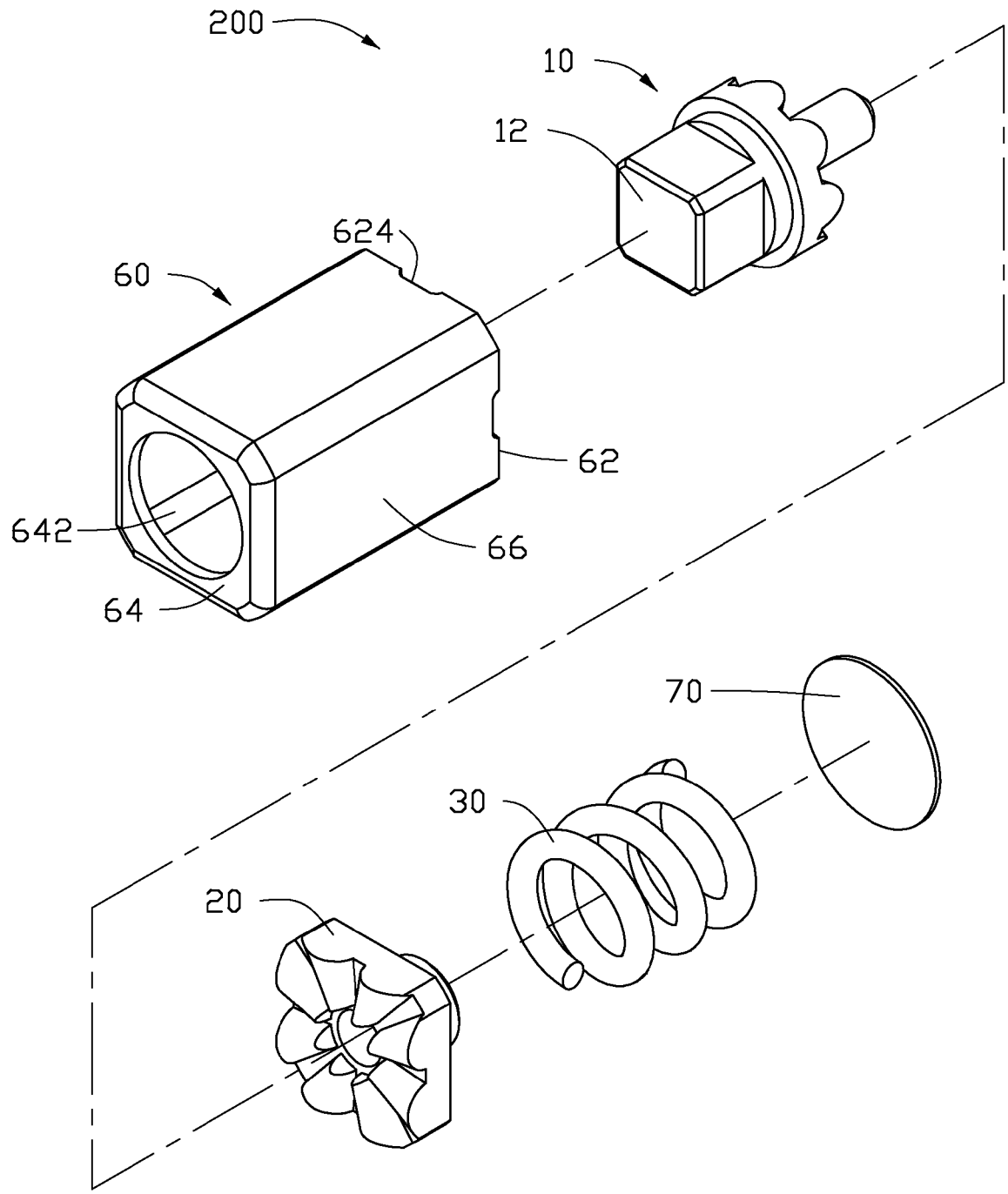
FIG. 6 is similar to FIG. 5, but shown from another aspect.
Figure 7:
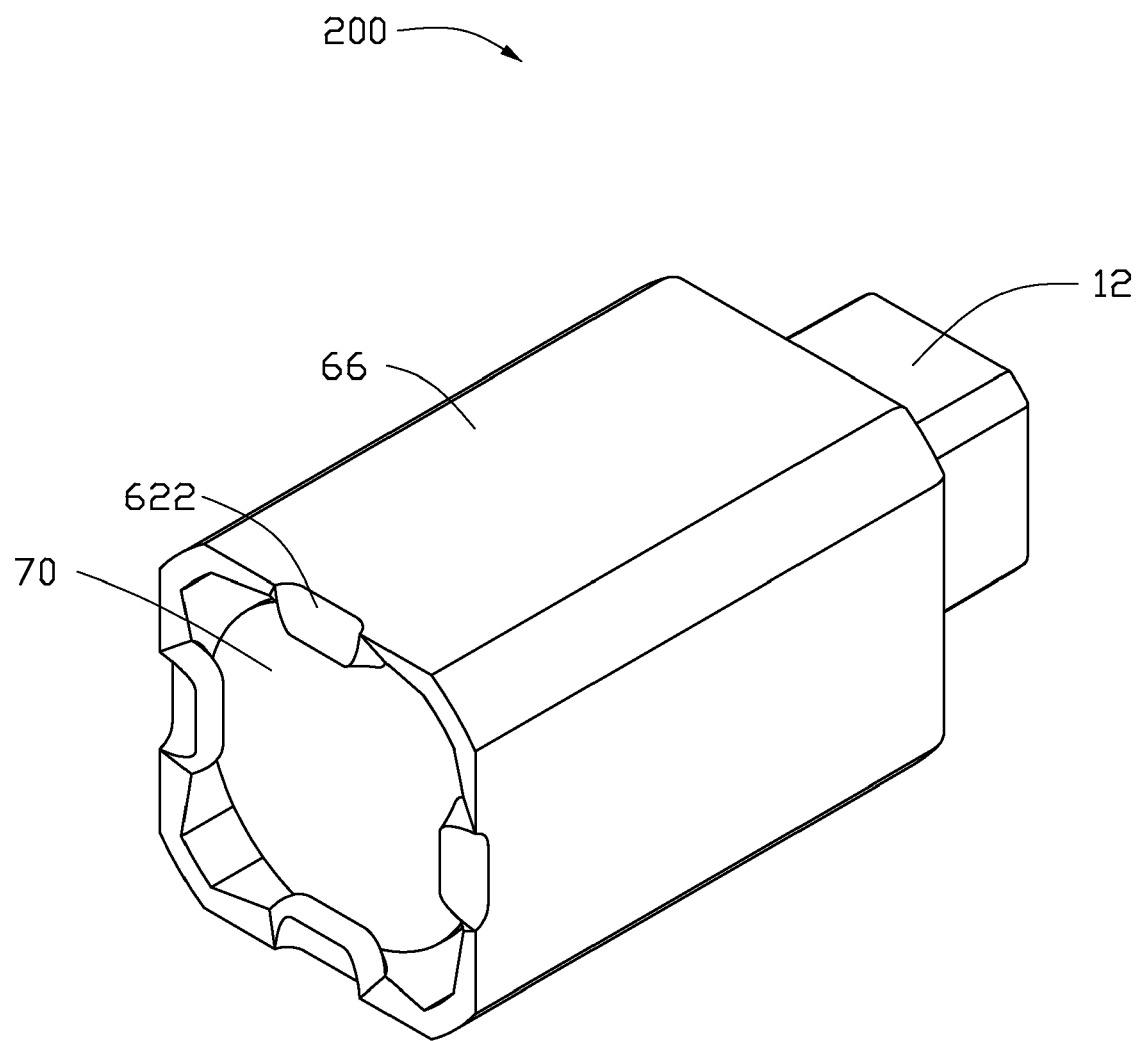
FIG. 7 is an assembled view of the hinge assembly shown in FIG. 5.

Referring to FIGS. 5 to 7, in another embodiment, the hinge assembly 200 is generally the same as the hinge assembly 100 of the first exemplary embodiment. A difference is that the sleeve 60 includes an open end 62 and a partially-closed end 64. The partially-closed end 64 defines a through hole 642. The head portion 12 of the first member 10 extends through the through hole 642. One end of the resilient member 30 is positioned near the open end 62 of the sleeve 60. A circular plate 70 is received in the sleeve 60, and abuts against the resilient member 30. The open end 62 is manufactured to have a plurality of tabs 622 and notches 624. The tabs 622 abut against the plate 70 to prevent the elements in the sleeve 60 from falling out of the sleeve 62. In this exemplary embodiment, since the head portion 12 does not need to extend from the open end 62, the tabs 622 may have a larger size to abut the plate 70.

It should be understood that the cam portions of the first member 10 and the second member 20 may have other shapes. The shape of the cam portion may be changed according to the desired open angle of the cover.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A hinge assembly for an electronic device having a body and a cover, the hinge assembly comprising:
   a sleeve comprising two ends and a sleeve wall, at least one of the ends being an open end, the sleeve adapted to be non-rotatably connected to the cover;
   a first member rotatable received in the sleeve and having a head portion exposed through one of the two ends of the sleeve and adapted to be connected to the body;
   a second member slidably received in the sleeve located next to the first member, one of the first member and the second member having a cam, the other of the first member and the second member having a cam follower interacting with the cam so that when the first member rotates about an axis and the second member moves linearly along the axis;
   a resilient member being fitted in the sleeve and one end thereof abutting one of the first member and the second member to bias the first member and the second member into contact with each other;
   a circular plate abuts against the resilient member;
   at least one punched tab partially blocking the open end, the at least one tab abutting against the circular plate and retaining the first member, the second member, the resilient member and the circular plate in the sleeve and preventing the first member, the second member, and the resilient member from escaping the sleeve through the open end.

2. The hinge assembly as claimed in claim 1, wherein a notch is defined in the open end corresponding to the at least one tab, the at least one tab blocks a minor portion of the open end.

3. The hinge assembly as claimed in claim 1, wherein the other end of the sleeve is a closed end opposite to the open end, and the other end of the resilient member abuts against the closed end.

4. The hinge assembly as claimed in claim 3, wherein the first member includes the cam, the head portion exposed from the open end, and the tabs abut at least one tab abuts against the cam.

5. The hinge assembly as claimed in claim 3, further comprising a loop ring, the first member includes the cam, a step surface is defined between the head portion and the cam, the loop ring abuts against the step surface, and the at least one tab abuts against the loop ring.

6. The hinge assembly as claimed in claim 1, wherein the other end of the sleeve is a partially-closed end opposite to the open end, and the other end of the resilient member is near the open end.

7. The hinge assembly as claimed in claim 6, wherein the first member includes the cam, and the head portion exposed from the partially-closed end.

8. A hinge assembly for an electronic device having a body and a cover, the hinge assembly comprising:
   a first member rotatable about an axis and having a head portion adapted to be connected to the body;
   a second member located next to the first member, the second member linearly movable along the axis;
   a resilient member locating next to the second member and one end thereof abutting one of the first member and the second member to bias the first member and the second member into contact with each other;
   a sleeve enclosing the first member, the second member, and the resilient member along the axis, the first member rotatably received in the sleeve, the second member slidably received in the sleeve and located next to the first member, the sleeve adapted to be non-rotatably connected to the cover, the sleeve including a flat open end defined by four rectangularly arranged walls of substantially the same length;
   at least one notch and at least one tab simultaneously formed by punching each of the four walls adjacent the open end for preventing the first member, the second member, and the resilient member from escaping the sleeve through the open end.

9. The hinge assembly as claimed in claim 8, wherein the sleeve includes a closed end opposite to the open end, and the other end of the resilient member abuts against the closed end.

10. The hinge assembly as claimed in claim 8, further comprising a loop ring, the first member includes a cam, a step surface is defined between the head portion and the cam, the loop ring abuts against the step surface, and the tabs abut against the loop ring.

11. The hinge assembly as claimed in claim 8, wherein the sleeve includes a partially-closed end opposite to the open end, and the other end of the resilient member is near to the open end.

12. The hinge assembly as claimed in claim 11, wherein the first member includes the cam, and the head portion exposed from the partially-closed end.

13. The hinge assembly as claimed in claim 12, further comprising a circular plate, the circular plate abuts against the other end of the resilient member, and the tabs abut against the circular plate.

14. The hinge assembly as claimed in claim 8, wherein the four walls define a not-flat perimeter rim by deforming the flat open end, the at least one notch and the at least one tab simultaneously formed on the not-flat perimeter rim.

15. A method for assembling a hinge assembly for an electronic device having a body and a cover, comprising:
   providing a sleeve including a first end and a second end, the first end having an opening and a flat peripheral rim surrounding the entire opening, the sleeve adapted to be non-rotatably connected to the cover, a first member having a head portion adapted to be connected to the body, a second member and a resilient member;
   receiving the first member, the second member and the resilient member in the sleeve through the open end, the first member rotatable received in the sleeve, the second member slidably received in the sleeve, one end of the resilient member abutting one of the first member and the second member to bias the first member and the second member into contact with each other;
   punching the entire flat peripheral rim of the first end to simultaneously form a deformed perimeter rim and a plurality of tabs on a whole peripheral edge of the deformed perimeter rim blocking the opening to retain the first member, the second member, and the resilient member in the sleeve.

16. The method as claimed in claim 15, further comprising a circular plate, wherein the circular plate abuts against the other end of the resilient member, and the at least one tab abuts against the circular plate.

17. The method as claimed in claim 15, wherein the step of punching the entire flat and even peripheral rim of the first end includes simultaneously defining a notch on each tab.

18. The method as claimed in claim 15, wherein the opening is defined by four rectangularly arranged walls of substantially the same length, the flat peripheral rim is positioned at one end of the walls, and each of the four walls is punched to form the tabs on the deformed perimeter rim.

* * * * *